Patented June 18, 1940

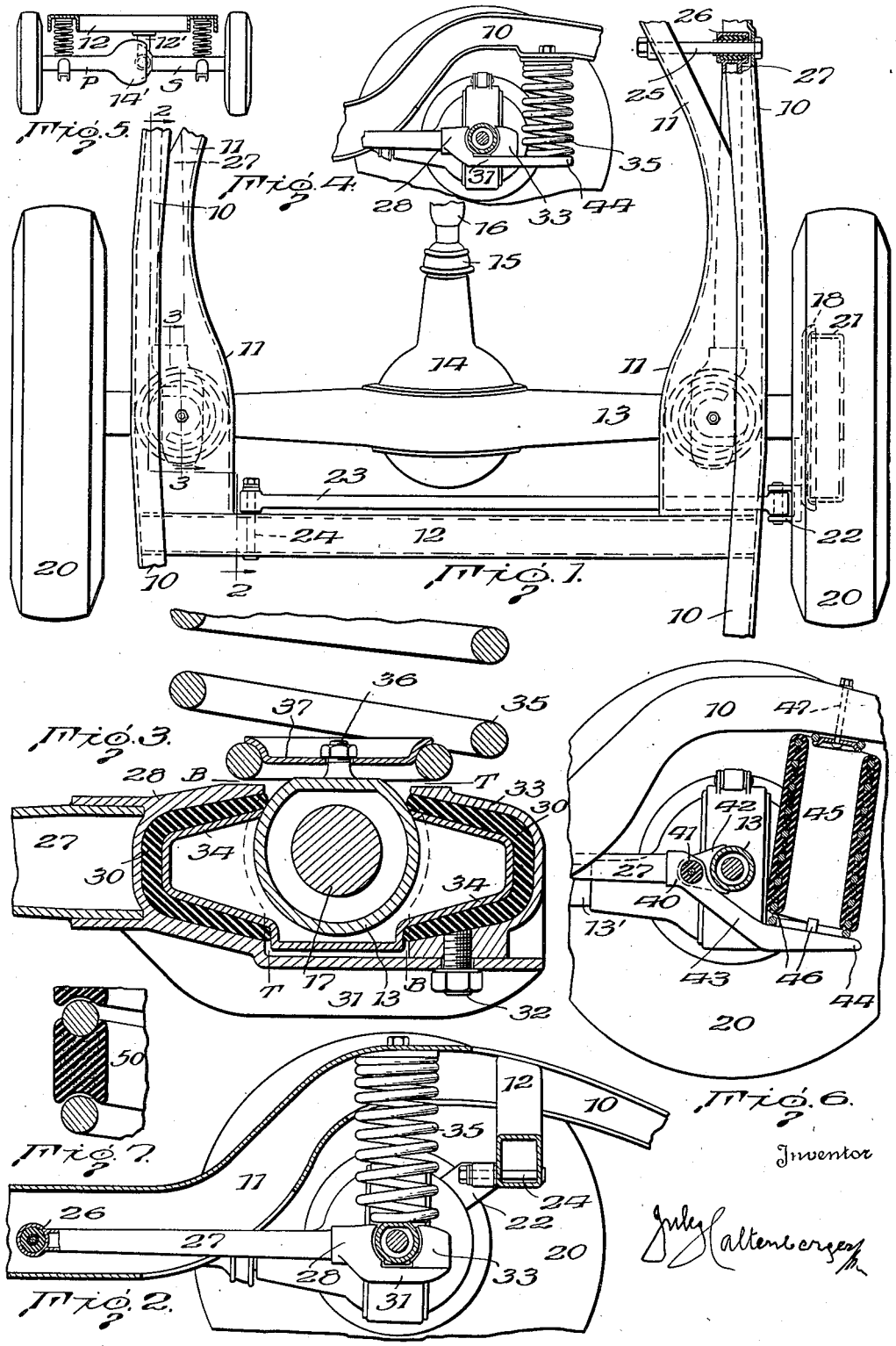

2,204,988

UNITED STATES PATENT OFFICE 2,204,988

SUSPENSION MEANS FOR DRIVE AXLES

Jules Haltenberger, Ann Arbor, Mich.

Application December 18, 1937, Serial No. 180,496

19 Claims. (Cl. 180—73)

My invention relates to automobile power axle mounting and suspension.

It has been proposed to combine in various forms a leaf spring suspension of an automobile with coil springs. Here it is proposed to eliminate the leaf spring in favor of a coil spring, and in the preferred form to design the connection between power axle and frame to yieldingly respond to: propulsion, deceleration, power torque, brake reaction and axle tilting, as a substitution for a Hotchkiss drive.

A further object is to provide a connection between a power axle and frame that is applicable as substitution for any known form of leaf spring drives either on a solid or a divided power axle, and to eliminate the necessity of oiling the connections.

A further object is to provide a coil spring with increasing rate while under loading to reduce the bound and rebound travel. Further objects of my invention will appear as the description proceeds.

The accompanying drawing illustrates my invention. Here Fig. 1 is a plan view of the rear part of an automobile; Fig. 2 is a sectional side elevation substantially on line 2—2 of Fig. 1; Fig. 3 is a sectional side elevation substantially on line 3—3 of Fig. 1, here illustrated on a larger scale; Fig. 4 shows a modification of the invention illustrated in a somewhat smaller scale; Fig. 5 illustrates the application of the invention to a hinged axle, here shown as a rear elevation and illustrated on a smaller scale; Fig. 6 is a side elevation of the rear part of an automobile, a modification of the invention; Fig. 7 is a modification of a detail illustrated in Fig. 6, here shown on a larger scale.

Referring to Figs. 1, 2 and 3, it will be seen that an automobile frame having side rails 10 and X members 11 is connected by a crossmember 12. Under the frame a power axle 13 is positioned having a drive gearing and differential in housing 14. It is arranged to be driven through a universal joint in housing 15 and a propeller shaft 16 by a power plant on the other end of the automobile (not shown).

Axle 13 is provided with the usual axle shafts 17 and the usual brake anchor plates 18 (only one is shown) and is supported by a pair of driving wheels 20 having brake drums 21 (only one is shown). The brake anchor plate is provided with a straddling bracket 22 where a rubber lined (or near equally yielding material here shall be referred to as "rubber") bushing in the end of a normally substantially horizontal lateral tie rod 23 is operatively connected. Through a similarly bushed end at the opposite end of the rod an operative connection is made with the crossmember 12 by bolt 24, thereby correlating the lateral position of the axle and the frame.

To correlate the longitudinal position of the axle and the frame, between the side rails 10 and X members 11, drive transmitting bolts 25 are provided (only one is illustrated), arranged to support the rubber bushed heads 26 of the distance rods 27. The opposite ends of these rods, as by welding, are provided with heads 28 having a cup shaped depression for the rubber thimbles 30 and are integral with channels 31 extending to the opposite side of axle 13. These channels, as by studs 32, firmly hold the cup shaped brackets 33 for the duplicate rubber thimbles 30. In the inside of these thimbles are positioned the inner cups 34 laterally protruding from and firmly secured to axle 13 as by butt or arc welding.

It is intended that the rubber thimbles 30 should be in compression when the assembly of the associated parts is completed. A pair of associated thimbles 30 form a two point compression connection between the axle and the distance rod. It will be noted that these two points are longitudinally spaced. For certain applications I might rely on these longitudinally spaced connections alone for the lateral location of the axle.

The upper sides of axle 13 near the cup and thimble joints are formed to a substantially horizontal surface to serve as a seat for a coil spring 35 (one at each end of the axle) and to hold such spring as by stud 36 and cup 37 respectively. The upper ends of the springs are positioned under the upper flanges of their associated side rails 10 and X members 11 respectively and are bolted to such upper flanges in any desired mannner.

The above described construction creates a flexible and yielding connection between the frame and driving axle and replaces all the desirable functions of the Hotchkiss drive. It also reduces the weight of the spring about 40% and eliminates the interleaf friction and the usual leaf spring jacket and spring oiling.

On the American continent about twenty-seven makes of cars use the Hotchkiss drive. Relatively recently two important manufacturers changed from torque tube drive to Hotchkiss drive but applicant is unaware of a reversed change.

It will be noted that the propulsion and deceleration of the automobile is transferred to the frame by further compressing either of the thimbles 30. To prevent an overcompression, the inner edges of head 28 and bracket 33, (as clear from Fig. 3 and therein indicated by dotted lines) are spaced at a lesser distance from the axle than the lateral thickness of the thimbles. Similarly to prevent over compression of the thimbles at torque action, limiting spaces T are provided, and for braking action limiting spaces B are provided; here again these limitations are dimensioned to stop the rocking of the axle before the thimble wall is over compressed.

It will be noted that except for the end clamping part coil, the coils of the spring 35 are parallel and of equal sections. As it is clear from the drawing, the spacing between the coils is progressive from zero and up. It is intended that at compression progressively more and more of the upper coils are to be eliminated (by space cancellation) thereby progressively changing the effective length of the coil spring. The change of the effective length of the spring correspondingly increases the rate of the spring; the travel at compression for a given load is materially reduced and by the same token the rebound of the vehicle is considerably diminished.

In Figs. 1, 2 and 3 applicant positions the single coil spring between the axle and frame. When it is desired to position the single coil spring to the rear of the axle this is illustrated in Fig. 4. Here the channel 31 is rearwardly extended to form a coil spring seat pad 44. In such spring position I prefer that the top of the coil spring be positioned under the bottom flange of the side rail 10 (to be described).

The advantages of the above described drive and suspension are not limited to solid axles. Full benefit is received when a hinged axle is used and more particularly when a two unit hinged axle is used; this is schematically illustrated in Fig. 5, where a primary wheel carrying axle unit P is fulcrumed at its inner end on the cross member 12 by a bracket 12'. The primary unit supports a secondary wheel carrying axle unit S. At the reduced needed spring compression travel the road clearance under the differential housing 14' is materially increased and correspondingly the maximum angle between the P and S units at spring flexure is reduced. This reduces the work of the interconnecting power transfer universal joint as described in my issued United States patents: #1,937,653 of December 5, 1933; #2,053,869 of September 8, 1936 and #2,055,975 of September 29, 1936.

Fig. 6 illustrates a modification of my invention. Here the distance rod 27 terminates in a head 40 arranged to contain a single rubber bushing 41 bolted to the straddling lugs 42 of axle 13. It will be noted that here the axle 13 is provided with a propeller shaft covering tube 13', as usually such tubing takes the torque and brake reaction. The propulsion and deceleration however are taken by distance rod 27. Head 40 is provided with a downwardly and rearwardly extended portion 43 terminating in a coil spring seat pad 44 where the bottom coil of a coil spring 45 is secured as by bent over lips 46. The top of the coil spring is positioned at the under side of the side rail 10 and is secured thereto as by bolt 47.

It will be noted that coil spring 45 has equally spaced coils but the principal coils are rubber jacketed and sponge rubber is vulcanized between each coil to give the increased rate at spring compression to reduce the spring travel.

To decrease the spring travel on automobiles already built or specified with coiled springs, as shown in Fig. 7, I provide an accessory rubber jacketed rubber sponge insert 50 and preferably cement the insert to the under side of the coil to prevent a water deposit there.

It will be noted that in all the illustrations applicant shows but one coil spring near the associated driving wheel. A single coil spring costs less to make and costs less to mount than two or more springs. Further, by using single coil springs applicant assures more contact surface for the spring rate increase here proposed.

For certain applications I prefer to insert a rubber spacer between the coils of the variable rate spring (not shown).

In Fig. 1 it is illustrated that the distance rod front connection to the frame is on a connecting bolt between the side rail and X member; for certain applications I prefer to mount the front connection either on the side rail or on the X member (not shown).

In the drawing (Fig. 3) a pair of associated rubber liners (30 and 30) are mounted on a non-concentric section of the axle housing and form a "two point" torque-yielding connection between the distance rods and axle. Applicant does not wish to be limited to the use of a pair of associated liners; as these liners might be easily connected to form one piece and arranged to be clamped between a non-concentric section of the axle housing and the mating distance rod (not shown), without departing however from the benefits of the yielding force transfers of a Hotchkiss drive, the opposing halves of this form of liner shall also be referred to as "two point."

What I claim as my invention:

1. In an automobile, a frame, a power rear axle, a lateral tie rod between said frame and axle, a variable rate coil spring between said axle and frame, a tubular distance rod between said frame and axle, a rubber lined bushing connecting said distance rod and frame, a two point partially compressed rubber lined connection between the distance rod and axle, and means limiting the compression of the lining of said two point connection.

2. In an automobile, a frame, a power rear axle, a lateral tie rod between said frame and axle, a tubular distance rod between said frame and axle, a variable rate coil spring at the rear of said axle between said distance rod and frame, a two point partially compressed rubber lined connection between the distance rod and axle, and means limiting the compression of the lining of said two point connection.

3. In an automobile, a frame, a power rear axle, a pair of driving wheels, a lateral tie rod between said frame and axle, a variable rate coil spring between said axle and frame, a distance rod between the frame and axle, a two point rubber connection between said distance rod and axle, and means limiting the load on said rubber connection at the rocking of said axle.

4. In an automobile, a frame, a power rear axle, a pair of driving wheels, a coil spring between said axle and frame, a distance rod between the frame and axle, a two point rubber connection between said distance rod and axle, and means limiting the load on said rubber connection at the rocking of said axle.

5. A substitution for a Hotchkiss drive automobile, comprising a frame, a power rear axle and driving wheel thereon, a coil spring between said axle and frame, a distance rod between said frame and axle, a connection including rubber between said distance rod and axle as the sole means of yielding power transfer of said Hotchkiss drive, and means to limit the yielding action of said power transfer.

6. In an automobile, a frame, a power rear axle, a distance rod between said frame and axle, rubber lined connections between said distance rod and frame and said rod and axle, and a variable rate coil spring at the rear of said axle between said distance rod and frame.

7. In an automobile, a frame, a power rear axle, a distance rod between said frame and axle, rubber lined connections between said distance rod and frame and said rod and axle, and a coil spring at the rear of said axle between said distance rod and frame.

8. Suspension means for a drive axle, comprising a frame, a Hotchkiss type power rear axle, coil springs between said axle and frame, means controlling the lateral position of said axle in relation to said frame, a pair of forwardly extending rigid distance rods with substantially universal connections at each end yieldingly resisting the torque reaction of said power axle connecting said axle to said frame.

9. The invention described in claim 8 wherein rubber linings form the substantially universal connections.

10. In an automobile, a frame, a power rear axle, a variable rate coil spring between said axle and frame, the coils of said spring being of substantially uniform diameter throughout substantially the entire length thereof and being of progressively increasing pitch with the lower end coil of reduced radius for clamping, a distance rod between the frame and axle, and a two point compression rubber connection between said distance rod and axle.

11. In an automobile, a frame, a power rear axle, a coil spring between said axle and frame, a distance rod between the frame and axle, and a two point compression rubber connection between said distance rod and axle.

12. Suspension means for a drive axle, comprising a frame, a Hotchkiss type power axle, coil springs between said axle and frame, a rigid distance rod connected to said frame with a one point connection including a yielding liner, a connection between said rod and axle including a pair of yieldingly supported radially extending thrust members, said connections yieldingly responding to propulsion, deceleration, power torque, brake reaction and axle tilting.

13. Suspension means for a drive axle, comprising a frame, a power axle, a rigid distance rod with a one point connection on said frame, a pair of yieldingly supported radially extending thrust members having a two point longitudinally spaced connection between said distance rod and axle, coil springs between said axle and frame, the longitudinal spacing of said two point connection controlling the lateral position of said axle in relation to said frame.

14. The invention described in claim 13 wherein the distance rod three connecting points are substantially alinged.

15. A substitution for a Hotchkiss drive, comprising a frame, a power axle, a rigid distance rod connected to said frame with a one point connection including a yielding liner, a connection between said rod and axle including at least two points and a yielding liner, said connections yieldingly responding to propulsion, deceleration, power torque, brake reaction, and axle tilting, a rearward extension on said rod and a coil spring between said extension and said frame.

16. In an automobile, a frame, an integral power axle, a torque tube on said axle, a forwardly extended distance rod connecting said axle to said frame including rubber liners between said distance rod and frame and distance rod and axle, a rear extension on said distance rod, and a coil spring between said extension and said frame.

17. In a motor vehicle, in combination, a frame; a Hotchkiss type rear axle; a forwardly extending radius rod controlling the longitudinal position of said axle in relation to said frame, a pivotal connection between said rod and said frame, rubber lined connections between said rod and said axle yieldingly controlling the torque reaction of said axle, means controlling the lateral position of said axle in relation to said frame, and spring means between said frame and axle, resiliently resisting upward movement of said axle relatively to said frame.

18. The invention described in claim 17, wherein the spring means are seated on the radius rod.

19. A substitution for a Hotchkiss drive automobile, comprising a frame, a Hotchkiss type power axle, a coil spring between said axle and frame, a distance rod between said frame and axle, and a connection including rubber in compression between said distance rod and axle as the sole means of yielding power transfer of said Hotchkiss drive.

JULES HALTENBERGER.